United States Patent
Wang

(10) Patent No.: US 11,665,644 B2
(45) Date of Patent: May 30, 2023

(54) DEVICE WAKEUP METHOD AND APPARATUS, ELECTRONIC DEVICE, AND STORAGE MEDIUM

(71) Applicant: Beijing Xiaomi Pinecone Electronics Co., Ltd., Beijing (CN)

(72) Inventor: Zhao Wang, Beijing (CN)

(73) Assignee: BEIJING XIAOMI PINECONE ELECTRONICS CO., LTD., Beijing (CN)

( * ) Notice: Subject to any disclaimer, the term of this patent is extended or adjusted under 35 U.S.C. 154(b) by 205 days.

(21) Appl. No.: 17/145,715

(22) Filed: Jan. 11, 2021

(65) Prior Publication Data

US 2021/0392583 A1 Dec. 16, 2021

(30) Foreign Application Priority Data

Jun. 12, 2020 (CN) .......................... 202010537368.7

(51) Int. Cl.
*G10L 25/24* (2013.01)
*H04W 52/02* (2009.01)
(Continued)

(52) U.S. Cl.
CPC ......... *H04W 52/0235* (2013.01); *G10L 15/22* (2013.01); *G10L 25/78* (2013.01);
(Continued)

(58) Field of Classification Search
CPC .......... H04W 52/0235; H04W 52/0229; G10L 15/22; G10L 25/78; G10L 15/30;
(Continued)

(56) References Cited

U.S. PATENT DOCUMENTS 6,070,140 A * 5/2000 Tran .................. G06F 3/167
 704/E15.045
9,445,209 B2 * 9/2016 Dadu ................. G10L 19/0018
(Continued)

FOREIGN PATENT DOCUMENTS

CN 104978507 A * 10/2015
CN 107077316 A 8/2017
(Continued)

OTHER PUBLICATIONS

Supplementary European Search Report in the European application No. 21155304.5, dated Jul. 26, 2021, 6 pgs.

*Primary Examiner* — Abul K Azad
(74) *Attorney, Agent, or Firm* — Cooper Legal Group, LLC

(57) ABSTRACT

The present disclosure relates to a device wakeup method and apparatus, an electronic device, and a storage medium. The wakeup method is applied to a first electronic device and includes: a wakeup message from a second electronic device is received, and when it is determined that a present state is an unawakened state, locally collected voice data is acquired; MFCC extraction is performed on the voice data to acquire a first MFCC of the voice data; the wakeup message is parsed to obtain a second MFCC included in the wakeup message; the first MFCC and the second MFCC are matched, and when it is determined that a difference between the first MFCC and the second MFCC is less than or equal to a set threshold value, a wakeup instruction is generated; and responsive to the wakeup instruction, the first electronic device is woken up.

20 Claims, 9 Drawing Sheets

(51) Int. Cl.
     *G10L 25/78*     (2013.01)
     *H04L 27/26*     (2006.01)
     *G10L 15/22*     (2006.01)
     *G10L 15/30*     (2013.01)

(52) U.S. Cl.
     CPC ..... *H04L 27/2639* (2013.01); *H04W 52/0229* (2013.01); *G10L 15/30* (2013.01); *G10L 25/24* (2013.01); *G10L 2015/223* (2013.01)

(58) Field of Classification Search
     CPC ... G10L 25/24; G10L 2015/223; G10L 25/51; H04L 27/2639
     See application file for complete search history.

(56) References Cited

U.S. PATENT DOCUMENTS

| | | | |
|---|---|---|---|
| 10,373,630 B2 * | 8/2019 | Ravindran | .............. G10L 25/24 |
| 2017/0060599 A1 | 3/2017 | Chen et al. | |
| 2018/0286414 A1 | 10/2018 | Ravindran | |
| 2019/0355379 A1 | 11/2019 | Ravindran et al. | |

FOREIGN PATENT DOCUMENTS

| | | |
|---|---|---|
| CN | 107704275 | 2/2018 |
| CN | 109658927 A | 4/2019 |
| CN | 109712624 A | 5/2019 |
| CN | 110534102 | 12/2019 |
| CN | 111048086 A | 4/2020 |
| JP | 2019204112 A | 11/2019 |

* cited by examiner

DEVICE WAKEUP METHOD AND APPARATUS, ELECTRONIC DEVICE, AND STORAGE MEDIUM

CROSS-REFERENCE TO RELATED APPLICATION

This application is filed based upon and claims priority to Chinese patent application No. 202010537368.7, filed on Jun. 12, 2020, the entire content of which is incorporated herein by reference.

TECHNICAL FIELD

The present disclosure relates to an electronic device turning-on technology, and more particularly, to a device wakeup method and apparatus, an electronic device, and a storage medium.

BACKGROUND

In an application scenario where electronic devices may be networked, for example, an application scenario where smart home devices are networked, most electronic devices such as the smart home devices support a voice turning-on function. However, wakeup engines, local arithmetic capabilities, network interaction capabilities and the like of different electronic devices are different. When multiple smart home devices are woken up, wakeup speeds of some electronic devices may be very low due to factors such as relatively slow responses, poor arithmetic capabilities or network delays of wakeup systems. In addition, when there are more networked electronic devices, there may be more electronic devices with relatively slow wakeup responses. Moreover, for multiple cooperating electronic devices, if some electronic devices cannot be timely woken up for slow responses, processing efficiency for all the cooperating electronic devices may be influenced. Exerting calculation capabilities of advantageous electronic devices under such a condition to assist in waking up the electronic devices that are not woken up when wakeup engines for the other devices are yet not completed helps to accelerate an overall wakeup response of the multiple cooperating electronic devices and improve user experiences. Unfortunately, there is yet no related art for reference at present.

SUMMARY

According to a first aspect of embodiments of the present disclosure, a device wakeup method is provided, which may be applied to a first electronic device and includes: a wakeup message from a second electronic device is received, and in response to determining that a present state is an unawakened state, locally collected voice data is acquired; Mel-frequency cepstral coefficient (MFCC) extraction is performed on the locally collected voice data to acquire a first MFCC of the locally collected voice data; the wakeup message is parsed to obtain a second MFCC included in the wakeup message; the first MFCC and the second MFCC are matched, and in response to determining that a difference between the first MFCC and the second MFCC is less than or equal to a set threshold value, a wakeup instruction is generated; and responsive to the wakeup instruction, the first electronic device is woken up.

According to a second aspect of embodiments of the present disclosure, an electronic device wakeup method is provided, which may be applied to a second electronic device and includes: voice data is collected, and the voice data is recognized to generate recognized voice information; the recognized voice information is matched in a voice instruction database; in response to determining that the recognized voice information is matched with a wakeup instruction, the wakeup instruction is called to wake up a first electronic device, and MFCC extraction is performed on the voice data to acquire an MFCC of the voice data; and a wakeup message is generated and broadcast through a communication interface, the wakeup message including the MFCC of the voice data.

According to a third aspect of embodiments of the present disclosure, an electronic device is provided, which may include a processor and a memory configured to store instructions executable by the processor, the processor being configured to call the executable instructions in the memory to execute any device wakeup method.

According to a fourth aspect of embodiments of the present disclosure, a non-transitory computer-readable storage medium is provided, instructions in the storage medium being executed by a processor of an electronic device to cause the electronic device to execute any device wakeup method.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
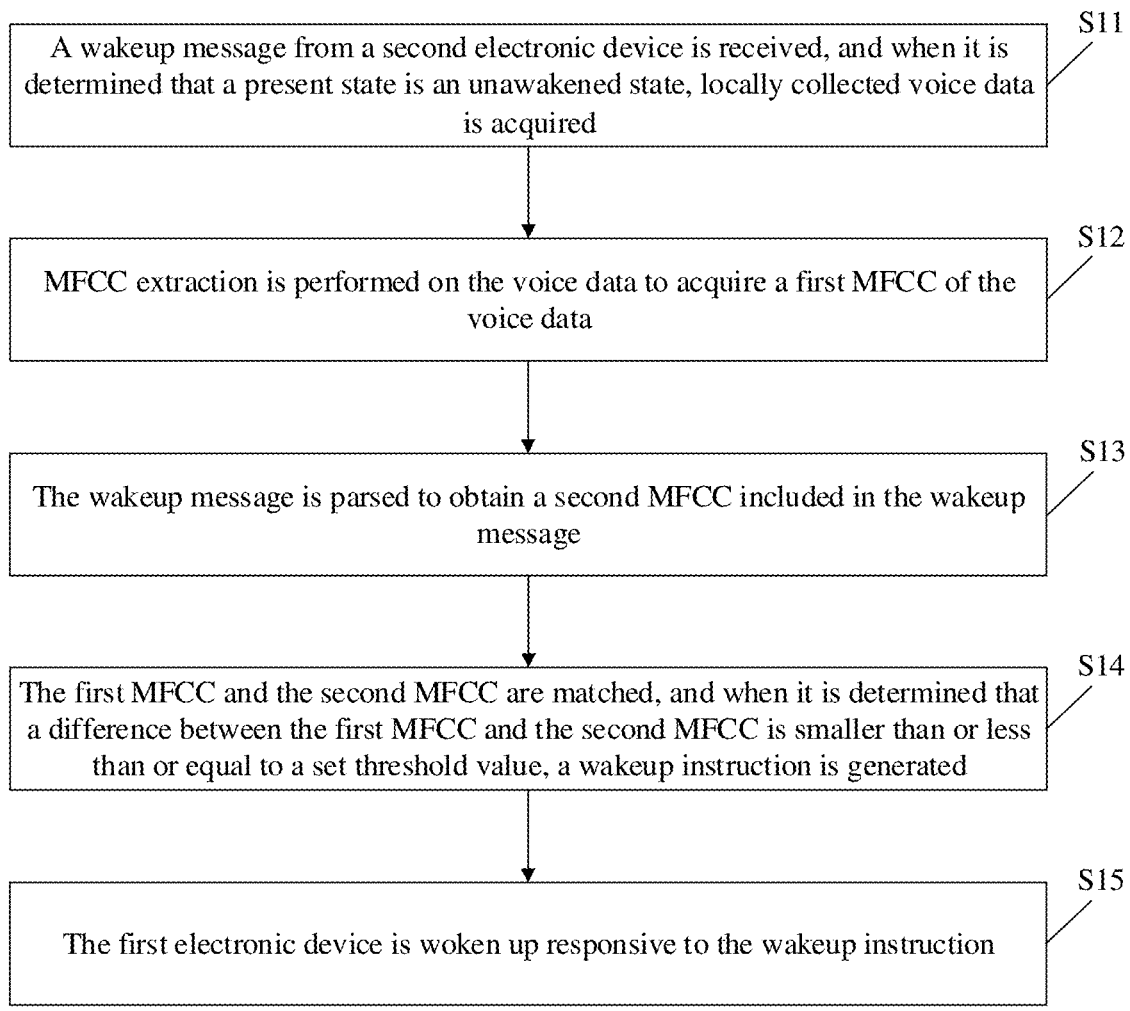
FIG. 1 is a flow chart showing a device wakeup method, according to an embodiment of the present disclosure.

FIG. 1 is a flow chart showing a device wakeup method, according to an embodiment of the present disclosure. As illustrated in FIG. 1, the device wakeup method in the embodiment of the present disclosure is applied to a first electronic device. The method includes the following operations.

At S11, a wakeup message from a second electronic device is received, and when it is determined that a present state is an unawakened state, locally collected voice data is acquired.

The device wakeup method in the embodiment of the present disclosure is applied to an electronic device group networked through the Internet, networked through a local area network, networked through the Internet of things or networked by near field communication (NFC), for example, smart home devices, Internet of vehicles terminals and intelligent meter recording terminals. Various electronic devices such as an audio and video device, an illumination system, curtain control, air conditioner control, a security system and a digital cinema system at home are connected together through an Internet of things technology to provide multiple functions and means of home appliance control, illumination control, curtain control, telephone remote control, indoor and outdoor remote control, security alarming, environmental monitoring, heating and ventilation control, infrared forwarding, programmable timing control and the like. Some home devices support a voice wakeup function. A user, when being required to turn on/activate a home device in a dormant state, says a wakeup voice to the home device, and the home device receives the wakeup voice, recognizes the wakeup voice, locally performs voice instruction matching, and after successful matching, turns on its own operating system for wakeup. However, for many home devices, particularly an air conditioner, a refrigerator and the like, processing time for responding to a wakeup voice is relatively long due to their own poor processing capabilities, which may result in relatively slow wakeup and starting of these home devices. A home device such as a home cinema, for example, intelligent stereo equipment and a smart television, has a very quick response and may recognize a wakeup voice rapidly and execute a wakeup operation due to high processing capability of the home device. In the embodiments of the present disclosure, the second electronic device capable of responding quickly is used as a wakeup delivery device in the embodiments of the present disclosure, and the first electronic device in a voice wakeup preparation stage is woken up through the second electronic device capable of responding quickly, such that the overall wakeup efficiency of the whole electronic device group is greatly improved.

In the embodiments of the present disclosure, the first electronic device refers to an electronic device of which a wakeup response mechanism is relatively low in processing speed in the networked electronic devices, and the second electronic device refers to an electronic device of which a wakeup response mechanism is relatively high in processing speed in the networked electronic devices. "First" and "second" are general terms and not intended to limit types or attributes of the electronic devices.

The embodiments of the present disclosure are not only applied to a smart home scenario but also applied to another electronic device group such as an electronic device group networked through the Internet of things, for example, an application scenario of a group of various detection sensors and intelligent photographic electronic devices in an intelligent parking management system.

In the embodiments of the present disclosure, after the first electronic device receives a message sent by the second electronic device, whether the received message is the wakeup message is determined at first. For example, an identification bit in the message is parsed to determine whether the message is the wakeup message. If a set identification bit includes a wakeup identifier, it is determined that the message is the wakeup message; or, whether the message includes an MFCC is parsed to judge whether the received message is the wakeup message. In the embodiments of the present disclosure, when the received message includes the MFCC, it is determined that the message is the wakeup message, otherwise the message is not the wakeup message.

When the electronic device receives the wakeup message, it is also necessary to determine its own present state. If the electronic device is in an unawakened state, a wakeup operation is executed responsive to the wakeup message. If it is determined that the present state is an awakened state, the wakeup message is discarded or shielded.

At S12, MFCC extraction is performed on the voice data to acquire a first MFCC of the voice data.

When the first electronic device determines that the wakeup message sent by the second electronic device is received and the first electronic device is in the unawakened state, the voice data collected by a local voice collection unit such as a microphone (MIC) is acquired. The voice data may be a voice wakeup instruction, but the electronic device is relatively poor in processing capability and thus has yet not executed wakeup responsive to the voice instruction. In such case, an MFCC of the possible voice instruction is extracted to determine whether to start another wakeup triggering mechanism.

Figure 2:
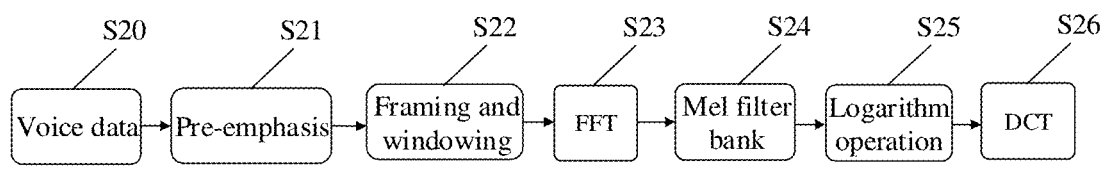
FIG. 2 is a flow chart showing MFCC extraction over voice data, according to an embodiment of the present disclosure.

FIG. 2 is a flow chart showing MFCC extraction over voice data, according to an embodiment of the present disclosure. As illustrated in FIG. 2, an MFCC extraction flow for the voice data in the embodiments of the present disclosure includes: receiving the voice data at S20, pre-emphasis processing at S21, framing and windowing processing at S22, fast Fourier transform (FFT) processing at S23, Mel filter bank filtering processing at S24, logarithm operation processing at S25, discrete cosine transform (DCT) processing at S26 and the like. A specific processing manner in each processing process will be described below in detail.

In the embodiments of the present disclosure, the pre-emphasis processing is performed on the voice data at first. Substantially, a voice signal passes through a high-pass filter. A mathematical expression of the high-pass filter is as follows:

$$H(Z) = 1 - \mu z^{-1} \qquad (1).$$

In the formula (1), Z represents the voice data, H(Z) represents voice data obtained by the pre-emphasis processing, and a value of $\mu$ is 0.9 to 1.0. $\mu$ is 0.97 in the embodiments of the present disclosure, and of course, may also be another value such as 0.93, 0.95, 0.94, 0.99 and the like. A purpose of the pre-emphasis processing is to improve a resolution of a high-frequency part in the voice data and flatten a spectrum of the signal, so as to ensure that the spectrum may be calculated by use of the same signal-to-noise ratio in a whole frequency band from a low frequency to a high frequency. In addition, the pre-emphasis processing is also for compensating the high-frequency part, suppressed by a sound production system, of the voice signal and highlighting a format of the high frequency.

In the embodiments of the present disclosure, the compensated voice data is divided into voice data segments according to a set time length. For conveniently analyzing the voice data, the voice data is divided into multiple voice data segments, also called frames. P sampling points are integrated to an observation unit, called a frame, at first. Under a normal condition, a value of P is 256 or 512 and covered time is about 20 to 30 ms. For avoiding an excessive change between two adjacent frames, when the voice data is segmented, there is an overlapping region between the two adjacent voice data segments (frames), the overlapping region includes M sampling points, and a value of M is usually about ½ or ⅓ of P. A sampling frequency of the voice signal for voice recognition is usually 8 kHz or 16 kHz. For example, in case of 8 kHz, if a frame length is 256 sampling points, a corresponding time length is 256/8,000×1,000=32 ms.

In the embodiments of the present disclosure, the compensated voice data is divided into multiple voice data segments according to a first set time length, a first voice data segment and a second voice data segment that are adjacent in the multiple voice data segments have an overlapping voice segment of a second set time length, and a value range of a ratio of the second set time length to the first set time length may be ⅓ to ⅔. Herein, the first set time length is 20 to 36 ms, and the second set time length may be 10 to 20 ms.

In the embodiments of the present disclosure, the voice data segment and a set Hamming window function are multiplied to form a windowed voice data segment. Each voice data segment (frame) and the Hamming window function are multiplied to improve the continuity of a left end and a right end of each frame. If a framed signal is S(n), n=0, 1, . . . , N−1, N being the number of frames, S'(n)=S(n)×W(n) after multiplication by a Hamming window. A form of W(n) is as follows:

$$W(n, a) = (1-a) - a \times \cos\left[\frac{2\pi n}{N-1}\right], 0 \le n \le N-1. \quad (2)$$

Herein, different Hamming windows may be generated under different values of a. In the embodiments of the present disclosure, the value of a may be 0.46.

In the embodiments of the present disclosure, Fourier transform is further performed on the windowed voice data segment to obtain a spectrum of the windowed voice data segment. Since it is difficult to obtain a characteristic of a signal by transform of the signal in a time domain, the signal is usually converted to an energy distribution in a frequency domain for observation, and different energy distributions may represent different voice characteristics. Therefore, after being multiplied by the Hamming window, each frame further requires fast Fourier transform (FFT) to obtain an energy distribution on the spectrum. FFT is performed on each frame of signal obtained by framing and windowing to obtain the spectrum of each frame. A modular square of the spectrum of the voice signal is calculated to obtain a power spectrum of the voice signal.

Figure 3:
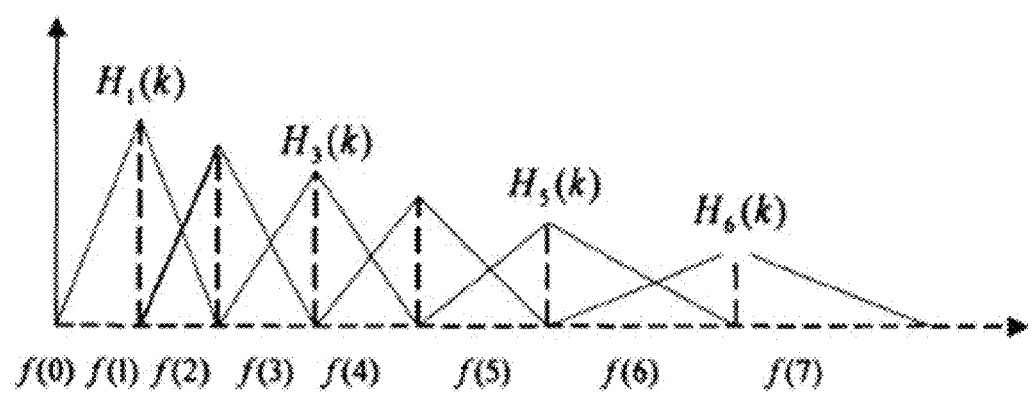
FIG. 3 is a schematic diagram illustrating filtering through a Mel-scale filter, according to an embodiment of the present disclosure.

In the embodiments of the present disclosure, the spectrum obtained by FFT is filtered through a Mel-scale filter formed by T triangular bandpass filters, and a logarithm of the filtered spectrum is calculated to obtain logarithmic energy of each output, a value range of T being 20 to 30. FIG. 3 is a schematic diagram illustrating filtering through a Mel-scale filter, according to an embodiment of the present disclosure. As illustrated in FIG. 3, the power spectrum of each frame is obtained through a Mel-scale triangular filter set. A filter set with T filters is defined, the adopted filters are triangular filters, and a center frequency is f(t), t=1, 2, . . . , T. A spacing between f(t) decreases along with a decrease of a value of t and increases along with an increase of the value of t, as illustrated in FIG. 3.

The logarithmic energy of the output of each filter set is calculated. DCT is performed on the logarithm to obtain the first MFCC.

Returning to FIG. 1, at S13, the wakeup message is parsed to obtain a second MFCC included in the wakeup message.

When the electronic device determines that the wakeup message is received and is presently in the unawakened state, the received wakeup message is parsed to obtain the second MFCC included in the wakeup message. It is to be noted that S13 and S12 may be executed concurrently, and there is no strict sequence requirement therebetween. S13 and S12 are correspondingly numbered only for description.

At S14, the first MFCC and the second MFCC are matched, and when it is determined that a difference between the first MFCC and the second MFCC is less than or equal to a set threshold value, a wakeup instruction is generated.

Figure 4:
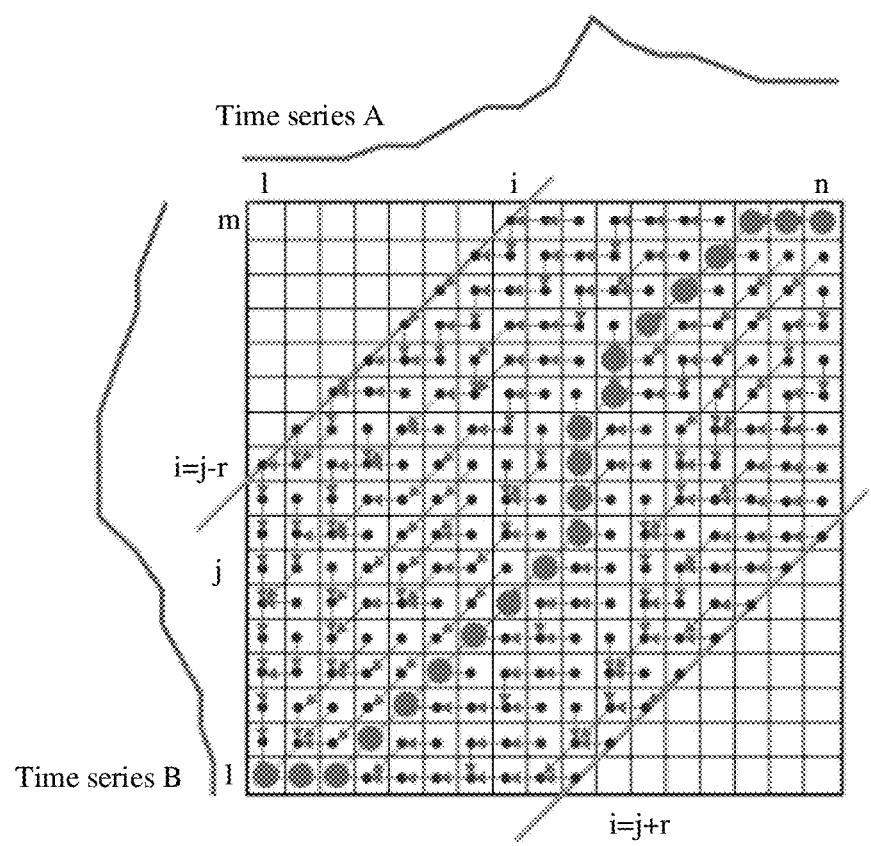
FIG. 4 is a schematic diagram illustrating a method for measuring a similarity of two series, according to an embodiment of the present disclosure.

In the embodiments of the present disclosure, both the first MFCC and the second MFCC are time series of which lengths are hypothesized to be n and m respectively, the first MFCC forms a first time series of serial numbers 1 to n, and the second MFCC forms a second time series of serial numbers 1 to m. FIG. 4 is a schematic diagram illustrating a method for measuring a similarity of two series, according to an embodiment of the present disclosure. As illustrated in FIG. 4, the first time series and the second time series form a two-dimensional coordinate system by taking (1, m) or (1, n) as an origin, m and n being natural numbers greater than 1. In the embodiment, the similarity between the two time series is determined by use of a dynamic time warping (DTW) algorithm. DTW is mainly applied to template matching of the time series, for example, isolated word voice recognition, gesture recognition, data mining, information retrieval and the like.

Figure 5:
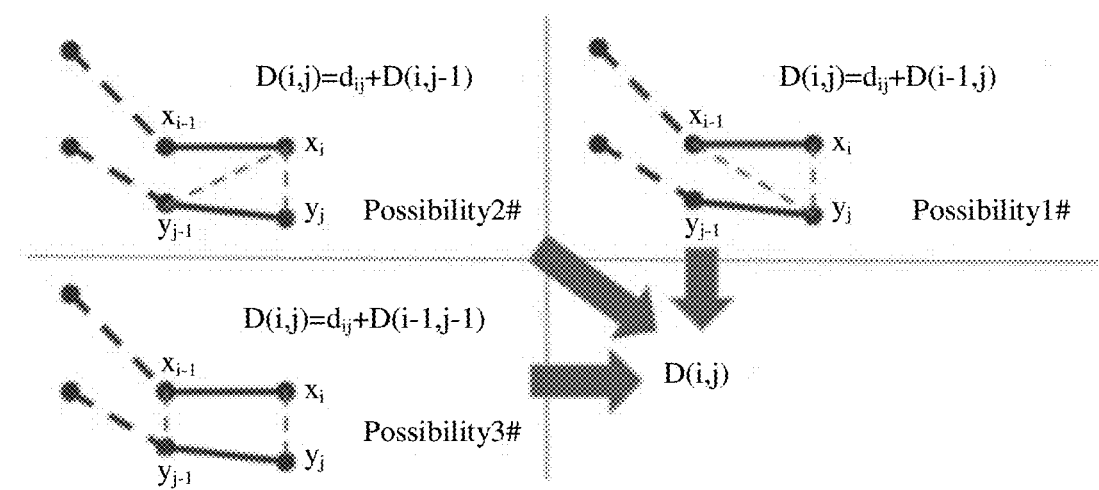
FIG. 5 is a schematic diagram illustrating a distance of a moment i of a series A and a moment j of a series B, according to an embodiment of the present disclosure.

FIG. 5 is a schematic diagram illustrating a distance of a moment i of a series A and a moment j of a series B, according to an embodiment of the present disclosure. As illustrated in FIG. 5, for a minimum cumulative distance D(i, j) of a position (i, j) in the two-dimensional coordinate system, it is determined that D(i, j)=$d_{ij}$+min[D(i−1, j), D(i, j−1), D(i−1, j−1)], where $d_{ij}$ is the cumulative distance from position (0,0) to position (i,j), D(i−1, j) represents a minimum cumulative distance of a position (i−1, j) in the two-dimensional coordinate system, D(i, j−1) represents a minimum cumulative distance of a position (i, j−1) in the two-dimensional coordinate system, and D(i−1, j−1) represents a minimum cumulative distance of a position (i−1, j−1) in the two-dimensional coordinate system.

In the embodiments of the present disclosure, a distance corresponding to each point of the two time series may be calculated to form an m×n matrix at first. Then, a shortest path is calculated according to cost of each element. Herein, an absolute value of a difference value of adjacent elements is called the cost of the element.

A minimum cumulative distance D(m, n) of a position (m, n) in the two-dimensional coordinate system is determined according to a presentation manner of the minimum cumulative distance $D(i, j)$. When $D(m, n)$ is less than or equal to a first set threshold value, it is determined that the difference between the first MFCC and the second MFCC is less than or equal to the set threshold value.

In the embodiments of the present disclosure, when it is determined that the difference between the first MFCC and the second MFCC is less than or equal to the set threshold value, the wakeup instruction is generated to trigger the electronic device for wakeup. If the difference between the first MFCC and the second MFCC is greater than the set threshold value, no wakeup instruction is generated, and an operation of executing the wakeup mechanism based on the voice instruction that is received before is continued.

Returning to FIG. 1, at S15, responsive to the wakeup instruction, the first electronic device is woken up.

After the wakeup instruction is generated based on MFCC comparison, the first electronic device is woken up, and the wakeup mechanism based on the voice instruction is not required to be processed.

In the embodiments of the present disclosure, after the wakeup instruction is generated, whether a present wakeup mechanism based on the voice data is started is determined, if YES, the present wakeup mechanism based on the voice data is stopped, and if NO, the present wakeup mechanism based on the voice data is shielded.

After electronic devices receive a wakeup voice instruction, an electronic device with a relatively high calculation capability may be woken up first. In such case, the electronic device that is woken up sends a wakeup message to another electronic device in a broadcast manner, and the broadcast wakeup message includes an MFCC based on the voice instruction. The electronic device with a relatively low processing capability which receives the voice instruction, when receiving the wakeup message, is directly woken up based on the wakeup message and does not execute a wakeup mechanism based on the voice instruction. Since the wakeup-message-based processing complexity is relatively low, after the wakeup message is received, whether to execute the wakeup mechanism may be determined by performing MFCC extraction based on locally received voice data and then performing matching. Therefore, according to the embodiments of the present disclosure, an electronic device with a quick response to a voice instruction may wake up another electronic device to implement direct wakeup of an electronic device with a relatively low processing speed through a wakeup message sent by another electronic device rather than wakeup responsive to the voice instruction, such that the overall wakeup efficiency of the electronic devices is improved, and particularly for cooperating electronic devices, improvement of the overall wakeup efficiency of the cooperating electronic devices is facilitated. The embodiments of the present disclosure are applied to pre-wakeup and pre-decision of multiple different devices in a networking scenario of multiple electronic devices such as smart home devices, decisions may be made without waiting till own wakeup engines of the devices work, the problem of low decision speed of a device due to a poor calculation capability and a long network delay is greatly improved, and user experience may be remarkably improved.

Figure 6:
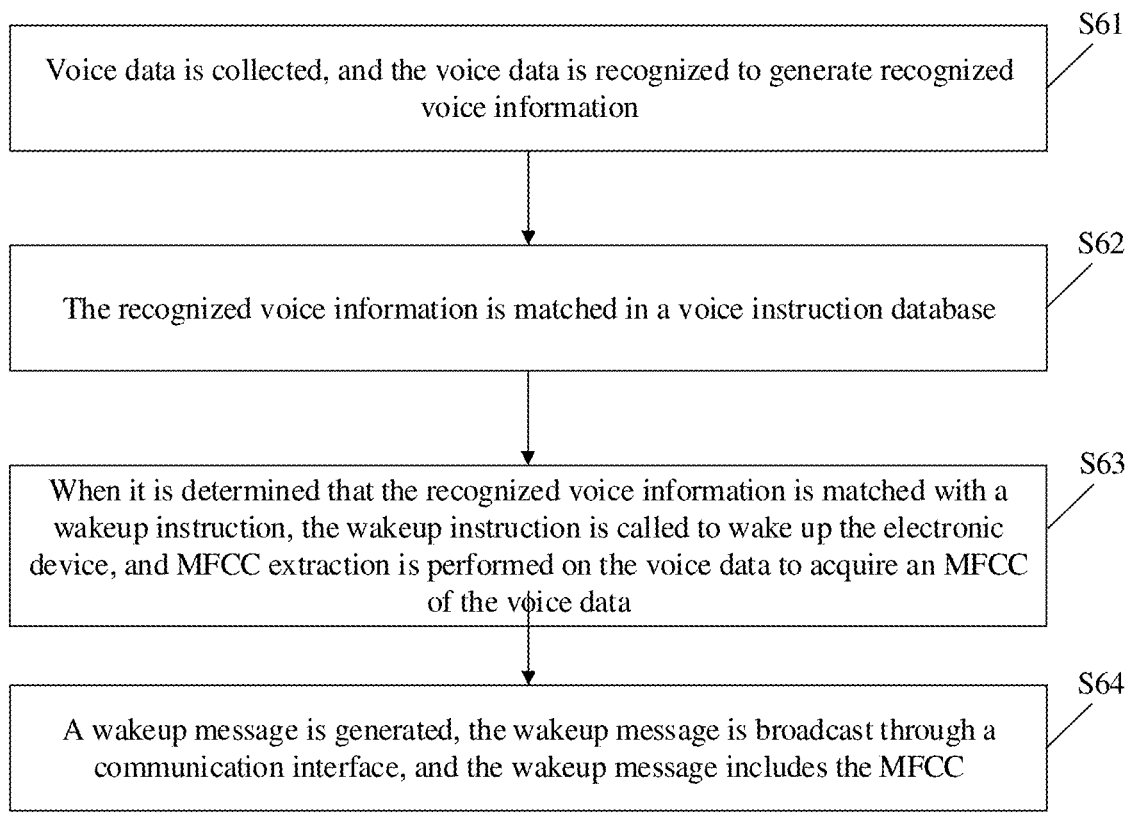
FIG. 6 is a flow chart showing another device wakeup method, according to an embodiment of the present disclosure.

FIG. 6 is a flow chart showing another device wakeup method, according to an embodiment of the present disclosure. As illustrated in FIG. 6, the electronic device wakeup method in the embodiment of the present disclosure is applied to a second electronic device. The method includes the following processing operations.

At S61, voice data is collected, and the voice data is recognized to generate recognized voice information.

The device wakeup method in the embodiment is applied to a networked electronic device group such as a smart home device group. A home device supports a voice wakeup function. A user, when needing to turn on the home device in a dormant state, says a wakeup voice to the home device. The home device receives the wakeup voice, recognizes the wakeup voice, locally performs voice instruction matching, and after successful matching, turns on its own operating system for wakeup. The embodiment is applied to an electronic device with a relatively high processing speed. After a voice instruction is received, the voice instruction is recognized, and when it is determined that the voice instruction is a wakeup instruction, an operating system of the electronic device is woken up responsive to the voice wakeup instruction.

The electronic device is in an unawakened state, and after receiving a voice signal, recognizes the voice signal, for example, recognizing the voice signal as a text content, to generate the recognized voice information.

At S62, the recognized voice information is matched in a voice instruction database.

The electronic device usually locally stores a voice instruction database, and matches the information subjected to voice recognition in the voice instruction database to determine a voice instruction type of the voice data received by the electronic device to execute the voice instruction corresponding to the voice data.

At S63, when it is determined that the recognized voice information is matched with a wakeup instruction, the wakeup instruction is called to wake up the electronic device, and MFCC extraction is performed on the voice data to acquire an MFCC of the voice data.

When it is determined that the recognized voice information corresponding to the presently received voice data is matched with the wakeup instruction, the wakeup instruction is directly called to wake up the electronic device. Of course, if it is determined that the recognized voice information is matched with another voice instruction, the another voice instruction is executed, or the another voice instruction is discarded in the unawakened state.

After the electronic device calls the wakeup instruction and is woken up, the electronic device needs to perform the MFCC extraction based on the collected voice data, and generates a wakeup message and broadcasts the wakeup message to another electronic device through a communication interface, to cause an electronic device with a relatively poor voice recognition mechanism processing capability to directly execute wakeup based on the wakeup message after receiving the wakeup message. An electronic device in an awakened state directly discards the wakeup message or makes no response after receiving the wakeup message. In the embodiments of the present disclosure, another wakeup mechanism is provided for wakeup of the electronic device to assist an electronic device with a relatively poor voice recognition capability or a relatively poor processing capability in directly executing wakeup through the wakeup message without executing the wakeup mechanism based on the voice instruction, such that the wakeup efficiency of the electronic device is improved.

In the embodiments of the present disclosure, the operation that the MFCC extraction is performed on the voice data includes: a high-frequency part in the voice data is compensated to improve a resolution of the high-frequency part; the compensated voice data is divided into voice data segments according to a set time length; the voice data segment and a set Hamming window function are multiplied to form a windowed voice data segment; Fourier transform is performed on the windowed voice data segment to obtain a spectrum of the windowed voice data segment; the spectrum is filtered through a Mel-scale filter formed by T triangular bandpass filters, and a logarithm of the filtered spectrum is calculated to obtain logarithmic energy of each output, a value range of T being 20 to 30; and DCT is performed on the logarithm to obtain the MFCC.

The operation that the MFCC extraction is performed on the voice data to acquire the MFCC of the voice data includes: the compensated voice data is divided into multiple voice data segments according to a first set time length, a first voice data segment and a second voice data segment that are adjacent in the multiple voice data segments have an overlapping voice segment of a second set time length, and a value range of a ratio of the second set time length to the first set time length may be ⅓ to ⅔.

Herein, a manner for performing the MFCC extraction on the voice data may refer to an MFCC extraction process in the abovementioned embodiments. An MFCC extraction flow for the voice data in the embodiments of the present disclosure includes: pre-emphasis processing, framing and windowing processing, Fourier transform processing, Mel filter bank filtering processing, logarithm operation processing, DCT processing and the like, which can be understood with reference to the related descriptions in the abovementioned embodiments, for example, the MFCC extraction manner in FIG. 2.

At S64, a wakeup message is generated, the wakeup message is broadcast through a communication interface, and the wakeup message includes the MFCC.

In the embodiments of the present disclosure, after the MFCC of the voice data is extracted, the wakeup message is generated, and the wakeup message includes the MFCC of the voice data. A wakeup identification bit may further be set in the wakeup message to cause another electronic device to determine a type of the message based on the identification bit in the wakeup message after receiving the wakeup message. After the wakeup message is generated, the electronic device broadcasts the wakeup message to another electronic device through a wired network or a wireless network such as a wireless fidelity (WIFI) network, a Bluetooth (BT) network and the like. The another electronic device in the connected network may receive the wakeup message broadcast by the electronic device through the wired network or the wireless network.

In the embodiments of the present disclosure, after it is determined that the recognized voice information is matched with the wakeup instruction, the method further includes: when it is determined that a present state is an awakened state, the recognized voice information is discarded, and the wakeup instruction is not called.

After electronic devices receive a wakeup voice instruction, an electronic device with a relatively high calculation capability may be woken up first. In such case, the electronic device that is woken up sends a wakeup message to another electronic device in a broadcast manner, the broadcast wakeup message including an MFCC based on the voice instruction, and the electronic device receiving the voice instruction and with a relatively low processing capability, when receiving the wakeup message, is directly woken up based on the wakeup message and does not execute a wakeup mechanism based on the voice instruction. Since the wakeup-message-based processing complexity is relatively low, after the wakeup message is received, whether to execute the wakeup mechanism may be determined by performing the MFCC extraction based on locally received voice data and then performing matching. Therefore, according to the embodiments of the present disclosure, an electronic device with a quick response to a voice instruction may wake up another electronic device to implement direct wakeup of an electronic device with a relatively low processing speed through a wakeup message sent by another electronic device rather than wakeup responsive to the voice instruction, such that the overall wakeup efficiency of the electronic devices is improved, and particularly for cooperating electronic devices, improvement of the overall wakeup efficiency of the cooperating electronic devices is facilitated. The embodiments of the present disclosure are applied to pre-wakeup and pre-decision of multiple different devices in a networking scenario of multiple electronic devices such as smart home devices, decisions may be made without waiting till own wakeup engines of the devices work, the problem of low decision speed of a device due to a poor calculation capability and a long network delay is greatly improved, and user experiences are remarkably improved.

Figure 7:
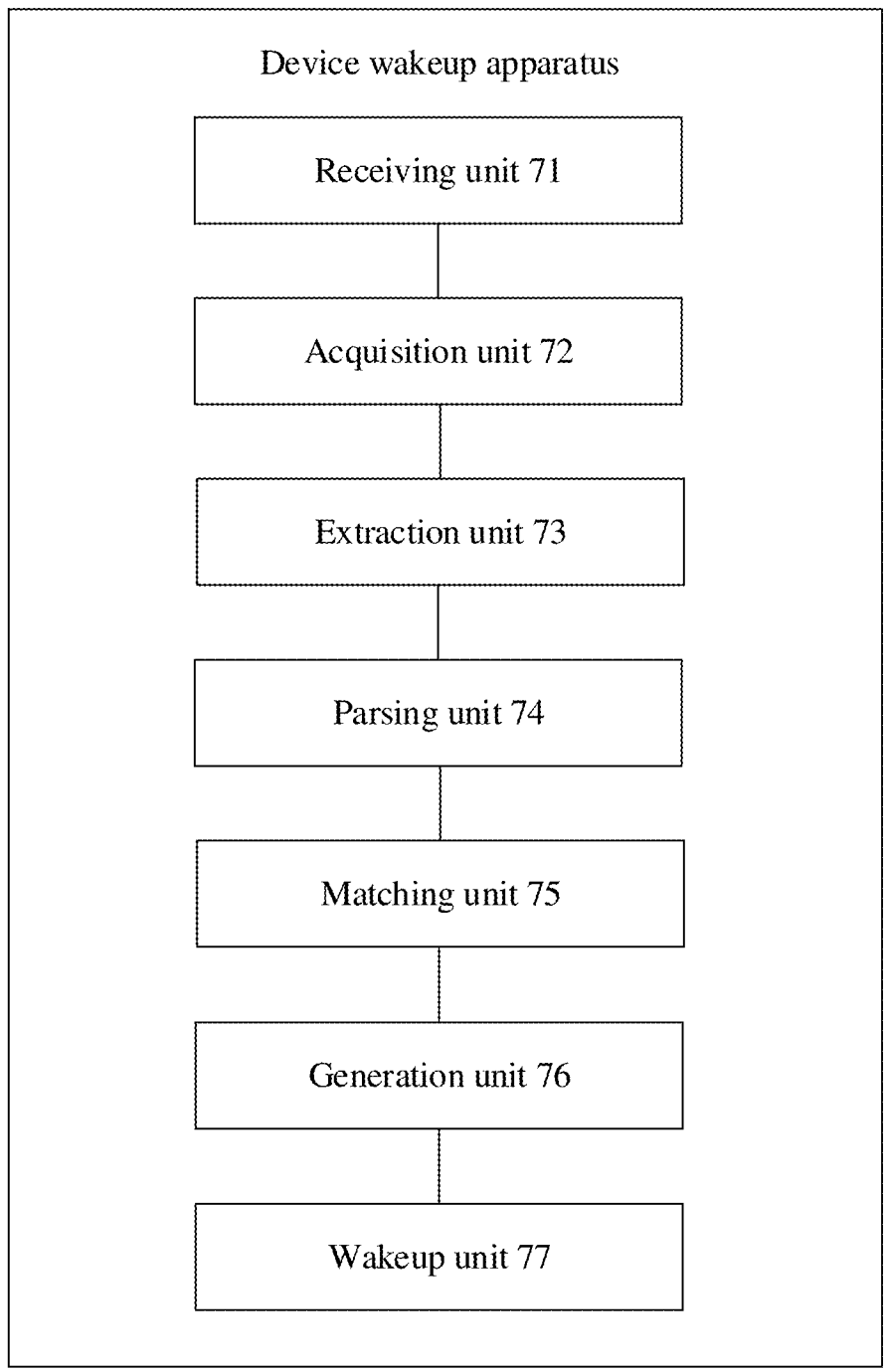
FIG. 7 is a composition structure diagram of a device wakeup apparatus, according to an embodiment of the present disclosure.

FIG. 7 is a composition structure diagram of a device wakeup apparatus, according to an embodiment of the present disclosure. As illustrated in FIG. 7, the electronic device wakeup apparatus in the embodiment of the present disclosure is arranged in a first electronic device. The apparatus includes: a receiving unit 71, an acquisition unit 72, an extraction unit 73, a parsing unit 74, a matching unit 75, a generation unit 76 and a wakeup unit 77.

The receiving unit 71 is configured to receive a wakeup message from a second electronic device.

The acquisition unit 72 is configured to, when a present state is an unawakened state, acquire locally collected voice data.

The extraction unit 73 is configured to perform MFCC extraction on the voice data to acquire a first MFCC of the voice data.

The parsing unit 74 is configured to parse the wakeup message to obtain a second MFCC included in the wakeup message.

The matching unit 75 is configured to match the first MFCC and the second MFCC and, when it is determined that a difference between the first MFCC and the second MFCC is less than or equal to a set threshold value, trigger the generation unit 76.

The generation unit 76 is configured to generate a wakeup instruction.

The wakeup unit 77 is configured to, responsive to the wakeup instruction, wake up the first electronic device.

Optionally, the extraction unit 73 includes: a compensation subunit, a division subunit, a windowing subunit, a Fourier transform subunit, a Mel filtering subunit and a cosine transform subunit.

The compensation subunit (not shown in the figure) is configured to compensate a high-frequency part in the voice data to improve a resolution of the high-frequency part.

The division subunit (not shown in the figure) is configured to divide the compensated voice data into voice data segments according to a set time length.

The windowing subunit (not shown in the figure) is configured to multiply the voice data segment and a set Hamming window function to form a windowed voice data segment.

The Fourier transform subunit (not shown in the figure) is configured to perform Fourier transform on the windowed voice data segment to obtain a spectrum of the windowed voice data segment.

The Mel filtering subunit (not shown in the figure) is configured to filter the spectrum through a Mel-scale filter formed by T triangular bandpass filters and calculate a logarithm of the filtered spectrum to obtain logarithmic energy of each output, a value range of T being 20 to 30.

The cosine transform subunit (not shown in the figure) is configured to perform DCT on the logarithm to obtain the first MFCC.

In the embodiments of the present disclosure, a specific structure and implementation mode of the extraction unit 72 may refer to the related descriptions of FIG. 2.

Optionally, the division subunit is further configured to divide the compensated voice data into multiple voice data segments according to a first set time length, a first voice data segment and a second voice data segment that are adjacent in the multiple voice data segments having an overlapping voice segment of a second set time length and a value range of a ratio of the second set time length to the first set time length being ⅓ to ⅔.

Optionally, the matching unit 75 is further configured to:

form a first time series of serial numbers 1 to n through the first MFCC, form a second time series of serial numbers 1 to m through the second MFCC, and form a two-dimensional coordinate system by taking (1, m) or (1, n) as an origin through the first time series and the second time series, m and n being natural numbers greater than 1;

for a minimum cumulative distance D(i, j) of a position (i, j) in the two-dimensional coordinate system, determine that $D(i, j)=d_{ij}+\min[D(i-1, j), D(i, j-1), D(i-1, j-1)]$, where $d_{ij}$ is the cumulative distance from position (0,0) to position (i,j), D(i–1, j) may represent a minimum cumulative distance of a position (i–1, j) in the two-dimensional coordinate system, D(i, j–1) may represent a minimum cumulative distance of a position (i, j–1) in the two-dimensional coordinate system, and D(i–1, j–1) may represent a minimum cumulative distance of a position (i–1, j–1) in the two-dimensional coordinate system; and determine a minimum cumulative distance D(m, n) of a position (m, n) in the two-dimensional coordinate system according to a presentation manner of the minimum cumulative distance D(i, j) and, when D(m, n) is less than or equal to a first set threshold value, determine that the difference between the first MFCC and the second MFCC is less than or equal to the set threshold value.

Optionally, based on the device wakeup apparatus in FIG. 7, the device wakeup apparatus in the embodiment of the present disclosure further includes: a determination unit (not shown in the figure), configured to, when the receiving unit 71 receives a message from the second electronic device, the message including a wakeup identifier, determine that the message is the wakeup message, and when it is determined that the present state is an awakened state, discard or shield the wakeup message.

Optionally, based on the device wakeup apparatus in FIG. 7, the device wakeup apparatus in the embodiment of the present disclosure further includes: an execution unit (not shown in the figure), configured to determine whether a present wakeup mechanism based on the voice data is started, if YES, stop the present wakeup mechanism based on the voice data, and if NO, shield the present wakeup mechanism based on the voice data.

In the embodiments of the present disclosure, the specific manners for performing operations for individual modules and units in the device wakeup apparatus in FIG. 7 have been described in detail in the embodiments regarding the method, which will not be repeated herein.

Figure 8:
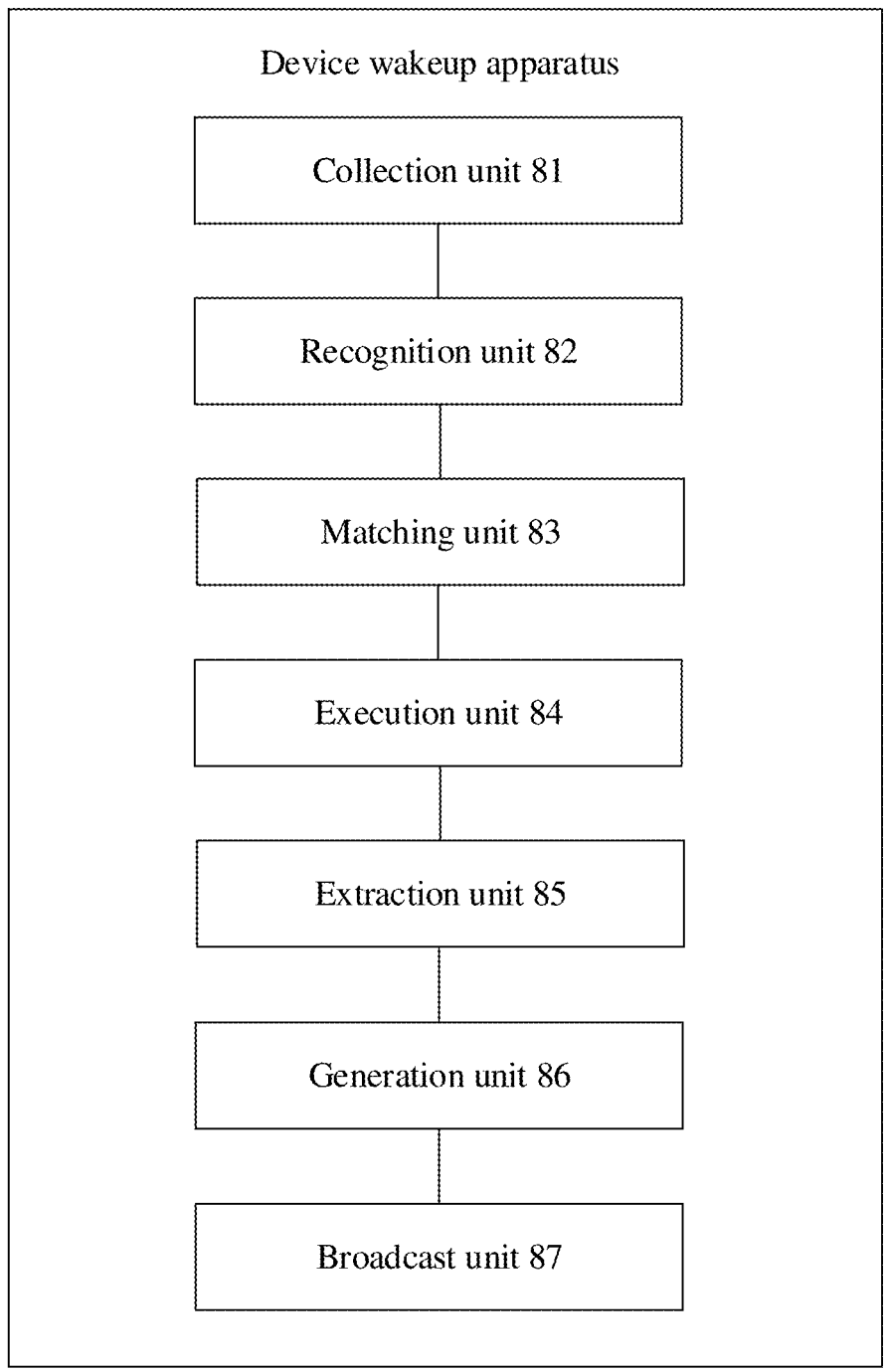
FIG. 8 is a composition structure diagram of another device wakeup apparatus, according to an embodiment of the present disclosure.

FIG. 8 is a composition structure diagram of another device wakeup apparatus, according to an embodiment of the present disclosure. As illustrated in FIG. 8, the device wakeup apparatus in the embodiment of the present disclosure is arranged in a second electronic device. The apparatus includes: a collection unit 81, a recognition unit 82, a matching unit 83, an execution unit 84, an extraction unit 85, a generation unit 86 and a broadcast unit 87.

The collection unit 81 is configured to collect voice data.

The recognition unit 82 is configured to recognize the voice data to generate recognized voice information.

The matching unit 83 is configured to match the recognized voice information in a voice instruction database and, when it is determined that the recognized voice information is matched with a wakeup instruction, trigger the execution unit 84.

The execution unit 84 is configured to call the wakeup instruction to wake up the electronic device.

The extraction unit 85 is configured to perform MFCC extraction on the voice data to acquire an MFCC of the voice data.

The generation unit 86 is configured to generate a wakeup message, the wakeup message including the MFCC.

The broadcast unit 87 is configured to broadcast the wakeup message through a communication interface.

Optionally, the extraction unit 85 includes: a compensation subunit, a division subunit, a windowing subunit, a Fourier transform subunit, a Mel filtering subunit and a cosine transform subunit.

The compensation subunit (not shown in the figure) is configured to compensate a high-frequency part in the voice data to improve a resolution of the high-frequency part.

The division subunit (not shown in the figure) is configured to divide the compensated voice data into voice data segments according to a set time length.

The windowing subunit (not shown in the figure) is configured to multiply the voice data segment and a set Hamming window function to form a windowed voice data segment.

The Fourier transform subunit (not shown in the figure) is configured to perform Fourier transform on the windowed voice data segment to obtain a spectrum of the windowed voice data segment.

The Mel filtering subunit (not shown in the figure) is configured to filter the spectrum through a Mel-scale filter formed by T triangular bandpass filters and calculate a logarithm of the filtered spectrum to obtain logarithmic energy of each output, a value range of T being 20 to 30.

The cosine transform subunit (not shown in the figure) is configured to perform DCT on the logarithm to obtain the MFCC.

In the embodiments of the present disclosure, a specific structure and implementation mode of the extraction unit 85 may refer to the related descriptions of FIG. 2.

Optionally, the division subunit is further configured to divide the compensated voice data into multiple voice data segments according to a first set time length, a first voice data segment and a second voice data segment that are adjacent in the multiple voice data segments having an overlapping voice segment of a second set time length and a value range of a ratio of the second set time length to the first set time length being ⅓ to ⅔.

Optionally, the execution unit 84 is further configured to, when the matching unit 83 determines that the recognized voice information is matched with the wakeup instruction and a present state is an awakened state, discard the recognized voice information and not call the wakeup instruction.

In the embodiments of the present disclosure, the specific manners for performing operations for individual modules and units in the device wakeup apparatus in FIG. 8 have been described in detail in the embodiments regarding the method, which will not be elaborated herein.

Figure 9:
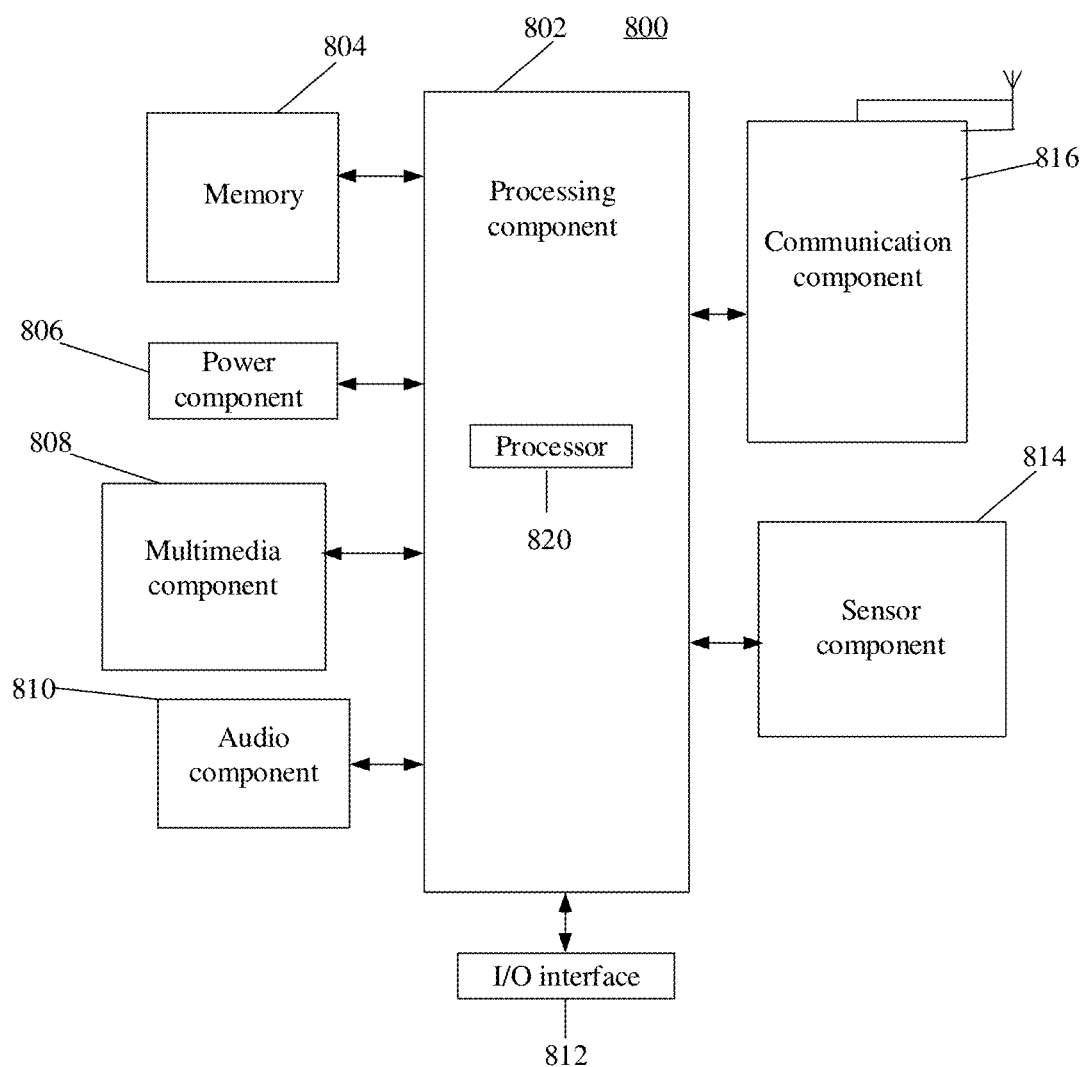
FIG. 9 is a block diagram of an electronic device, according to an embodiment of the present disclosure.

FIG. 9 is a block diagram of an electronic device 800, according to an exemplary embodiment. As illustrated in FIG. 9, the electronic device 800 supports multi-screen output. The electronic device 800 may include one or more of the following components: a processing component 802, a memory 804, a power component 806, a multimedia component 808, an audio component 810, an input/output (I/O) interface 812, a sensor component 814 and a communication component 816.

The processing component 802 typically controls overall operations of the electronic device 800, such as the operations associated with display, telephone calls, data communications, camera operations, and recording operations. The processing component 802 may include one or more processors 820 to execute instructions to perform all or part of the steps in the abovementioned method. Moreover, the processing component 802 may include one or more modules which facilitate interaction between the processing component 802 and other components. For instance, the processing component 802 may include a multimedia module to facilitate interaction between the multimedia component 808 and the processing component 802.

The memory 804 is configured to store various types of data to support the operation of the device 800. Examples of such data include instructions for any applications or methods operated on the electronic device 800, contact data, phonebook data, messages, pictures, video, etc. The memory 804 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 806 provides power for various components of the electronic device 800. The power component 806 may include a power management system, one or more power supplies, and other components associated with generation, management and distribution of power for the electronic device 800.

The multimedia component 808 includes a screen providing an output interface between the electronic device 800 and a user. In some embodiments, the screen may include a liquid crystal display (LCD) and a touch panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a period of time and a pressure associated with the touch or swipe action. In some embodiments, the multimedia component 808 includes a front camera and/or a rear camera. The front camera and/or the rear camera may receive external multimedia data when the device 800 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a MIC, and the MIC is configured to receive an external audio signal when the electronic device 800 is in an operation mode, such as a call mode, a recording mode and a voice recognition mode. The received audio signal may further be stored in the memory 804 or sent through the communication component 816. In some embodiments, the audio component 810 further includes a speaker configured to output the audio signal.

The I/O interface 812 provides an interface between the processing component 802 and peripheral interface modules, such as a keyboard, a click wheel, buttons, and the like. The buttons may include, but are not limited to: a home button, a volume button, a starting button and a locking button.

The sensor component 814 includes one or more sensors configured to provide status assessments in various aspects for the electronic device 800. For instance, the sensor component 814 may detect an on/off status of the device 800 and relative positioning of components, such as a display and small keyboard of the electronic device 800, and the sensor component 814 may further detect a change in a position of the electronic device 800 or a component of the electronic device 800, presence or absence of contact between the user and the electronic device 800, orientation or acceleration/deceleration of the electronic device 800 and a change in temperature of the electronic device 800. The sensor component 814 may include a proximity sensor configured to detect presence of an object nearby without any physical contact. The sensor component 814 may also include a light sensor, such as a complementary metal oxide semiconductor (CMOS) or charge coupled device (CCD) image sensor, configured for use in an imaging application. In some embodiments, the sensor component 814 may also include an acceleration sensor, a gyroscope sensor, a magnetic sensor, a pressure sensor or a temperature sensor.

The communication component 816 is configured to facilitate wired or wireless communication between the electronic device 800 and other devices. The electronic device 800 may access a communication-standard-based wireless network, such as a WiFi network, a 2nd-generation (2G) or 3rd-generation (3G) network or a combination thereof. In an exemplary embodiment, the communication component 816 receives a broadcast signal or broadcast associated information from an external broadcast management system through a broadcast channel In an exemplary embodiment, the communication component 816 further includes an NFC module to facilitate short-range communications. For example, the NFC module may be implemented based on a radio frequency identification (RFID) technology, an infrared data association (IrDA) technology, an ultra-wide band (UWB) technology, a BT technology, and other technologies.

In an exemplary embodiment, the electronic device 800 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, and is configured to execute a device wakeup method in the abovementioned embodiments.

In an exemplary embodiment, there is also provided a non-transitory computer-readable storage medium including instructions, such as included in the memory 804, executable by the processor 820 of the electronic device 800 for performing a device wakeup method for an electronic device in the abovementioned embodiments. For example, the non-transitory computer-readable storage medium may be a ROM, a random access memory (RAM), a compact disc read-only memory (CD-ROM), a magnetic tape, a floppy disc, an optical data storage device and the like.

The embodiments of the present disclosure also provide a non-transitory computer-readable storage medium, instructions in the storage medium are executed by a processor of a first electronic device to cause the first electronic device to execute a control method. The method includes: a wakeup message from a second electronic device is received, and in response to determining that a present state is an unawakened state, locally collected voice data is acquired; MFCC extraction is performed on the voice data to acquire a first MFCC of the voice data; the wakeup message is parsed to obtain a second MFCC included in the wakeup message; the first MFCC and the second MFCC are matched, and in response to determining that a difference between the first MFCC and the second MFCC is less than or equal to a set threshold value, a wakeup instruction is generated; and responsive to the wakeup instruction, the first electronic device is woken up.

The embodiments of the present disclosure also provide a non-transitory computer-readable storage medium, instructions in the storage medium are executed by a processor of a second electronic device to cause the second electronic device to execute a control method. The method includes: voice data is collected, and the voice data is recognized to generate recognized voice information; the recognized voice information is matched in a voice instruction database; in response to determining that the recognized voice information is matched with a wakeup instruction, the wakeup instruction is called to wake up the electronic device, and MFCC extraction is performed on the voice data to acquire an MFCC of the voice data; and a wakeup message is generated and broadcast through a communication interface, the wakeup message including the MFCC.

Other implementation solutions of the present disclosure will be apparent to those skilled in the art from consideration of the specification and practice of the present disclosure. This present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A device wakeup method, applied to a first electronic device, comprising:
    receiving a wakeup message from a second electronic device, and in response to determining that a present state is an unawakened state, acquiring locally collected voice data;
    performing Mel-frequency cepstral coefficient (MFCC) extraction on the locally collected voice data to acquire a first MFCC of the locally collected voice data;
    parsing the wakeup message to obtain a second MFCC comprised in the wakeup message;
    matching the first MFCC and the second MFCC, and in response to determining that a difference between the first MFCC and the second MFCC is less than or equal to a set threshold value, generating a wakeup instruction; and
    responsive to the wakeup instruction, waking up the first electronic device.

2. The method of claim 1, wherein performing the MFCC extraction on the locally collected voice data to acquire the first MFCC of the locally collected voice data comprises:
    compensating a high-frequency part in the locally collected voice data to improve a resolution of the high-frequency part;
    dividing the compensated voice data into voice data segments according to a set time length;
    multiplying each of the voice data segments and a set Hamming window function to form a windowed voice data segment;
    performing Fourier transform on the windowed voice data segment to obtain a spectrum of the windowed voice data segment;
    filtering the spectrum through a Mel-scale filter formed by T triangular bandpass filters, and calculating a logarithm of the filtered spectrum to obtain logarithmic energy of each output, a value range of T being 20 to 30; and
    performing discrete cosine transform (DCT) on the logarithm to obtain the first MFCC.

3. The method of claim 2, wherein dividing the compensated voice data into the voice data segments according to the set time length comprises:
    dividing the compensated voice data into multiple voice data segments according to a first set time length, a first voice data segment and a second voice data segment that are adjacent in the multiple voice data segments having an overlapping voice segment of a second set time length and a value range of a ratio of the second set time length to the first set time length being ⅓ to ⅔.

4. The method of claim 1, wherein matching the first MFCC and the second MFCC and determining that the difference between the first MFCC and the second MFCC is less than or equal to the set threshold value comprises:
    forming a first time series of serial numbers 1 to n through the first MFCC, forming a second time series of serial numbers 1 to m through the second MFCC, and forming a two-dimensional coordinate system by taking (1, m) or (1, n) as an origin through the first time series and the second time series, m and n being natural numbers greater than 1;
    for a minimum cumulative distance $D(i, j)$ of a position $(i, j)$ in the two-dimensional coordinate system, determining that $D(i, j)=d_{ij}+\min[D(i-1, j), D(i, j-1), D(i-1, j-1)]$, where $d_{ij}$ is the cumulative distance from position $(0,0)$ to position $(i,j)$, $D(i-1, j)$ represents a minimum cumulative distance of a position $(i-1, j)$ in the two-dimensional coordinate system, $D(i, j-1)$ represents a minimum cumulative distance of a position $(i, j-1)$ in the two-dimensional coordinate system, and $D(i-1, j-1)$ represents a minimum cumulative distance of a position $(i-1, j-1)$ in the two-dimensional coordinate system; and
    determining a minimum cumulative distance $D(m, n)$ of a position $(m, n)$ in the two-dimensional coordinate system according to a presentation manner of the minimum cumulative distance $D(i, j)$, and in response to $D(m, n)$ being less than or equal to a first set threshold value, determining that the difference between the first MFCC and the second MFCC is less than or equal to the set threshold value.

5. The method of claim 1, further comprising:
in response to receiving a message comprising a wakeup identifier from the second electronic device, determining that the message is the wakeup message; and
in response to determining that the present state is an awakened state, discarding or shielding the wakeup message.

6. The method of claim 1, after the wakeup instruction is generated, further comprising:
determining whether a present wakeup mechanism based on the locally collected voice data is started, when YES, stopping the present wakeup mechanism based on the locally collected voice data, and when NO, shielding the present wakeup mechanism based on the locally collected voice data.

7. A device wakeup method, applied to a second electronic device, comprising:
collecting, by a microphone of the second electronic device, voice data, and recognizing the voice data to generate recognized voice information;
matching the recognized voice information in a voice instruction database;
in response to determining that the recognized voice information is matched with a wakeup instruction, calling the wakeup instruction to wake up the second electronic device, and performing, by a filter of the second electronic device, Mel-frequency cepstral coefficient (MFCC) extraction on the voice data to acquire an MFCC of the voice data; and
generating a wakeup message, and broadcasting the wakeup message through a communication interface of the second electronic device, the wakeup message comprising the MFCC of the voice data, wherein the wakeup message comprises a wakeup identification bit for indicating type of the wakeup message.

8. The method of claim 7, wherein performing the MFCC extraction on the voice data to acquire the MFCC of the voice data comprises:
compensating a high-frequency part in the voice data to improve a resolution of the high-frequency part;
dividing the compensated voice data into voice data segments according to a set time length;
multiplying each of the voice data segments and a set Hamming window function to form a windowed voice data segment;
performing Fourier transform on the windowed voice data segment to obtain a spectrum of the windowed voice data segment;
filtering the spectrum through a Mel-scale filter formed by T triangular bandpass filters, and calculating a logarithm of the filtered spectrum to obtain logarithmic energy of each output, a value range of T being 20 to 30; and
performing discrete cosine transform (DCT) on the logarithm to obtain the MFCC of the voice data.

9. The method of claim 8, wherein dividing the compensated voice data into the voice data segments according to the set time length comprises:
dividing the compensated voice data into multiple voice data segments according to a first set time length, a first voice data segment and a second voice data segment that are adjacent in the multiple voice data segments having an overlapping voice segment of a second set time length and a value range of a ratio of the second set time length to the first set time length being ⅓ to ⅔.

10. The method of claim 7, after it is determined that the recognized voice information is matched with the wakeup instruction, further comprising:
in response to determining that a present state is an awakened state, discarding the recognized voice information, and not calling the wakeup instruction.

11. A device wakeup apparatus, arranged in a first electronic device, comprising:
a processor; and
a memory for storing instructions executable by the processor;
wherein the processor is configured to:
receive a wakeup message from a second electronic device;
in response to a present state being an unawakened state, acquire locally collected voice data;
perform Mel-frequency cepstral coefficient (MFCC) extraction on the locally collected voice data to acquire a first MFCC of the locally collected voice data;
parse the wakeup message to obtain a second MFCC comprised in the wakeup message;
match the first MFCC and the second MFCC and, in response to determining that a difference between the first MFCC and the second MFCC is less than or equal to a set threshold value, generate a wakeup instruction; and
responsive to the wakeup instruction, wake up the first electronic device.

12. The apparatus of claim 11, wherein the processor is further configured to:
compensate a high-frequency part in the locally collected voice data to improve a resolution of the high-frequency part;
divide the compensated voice data into voice data segments according to a set time length;
multiply each of the voice data segments and a set Hamming window function to form a windowed voice data segment;
perform Fourier transform on the windowed voice data segment to obtain a spectrum of the windowed voice data segment;
filter the spectrum through a Mel-scale filter formed by T triangular bandpass filters and calculate a logarithm of the filtered spectrum to obtain logarithmic energy of each output, a value range of T being 20 to 30; and
perform discrete cosine transform (DCT) on the logarithm to obtain the first MFCC.

13. The apparatus of claim 12, wherein the processor is further configured to divide the compensated voice data into multiple voice data segments according to a first set time length, a first voice data segment and a second voice data segment that are adjacent in the multiple voice data segments having an overlapping voice segment of a second set time length and a value range of a ratio of the second set time length to the first set time length being ⅓ to ⅔.

14. The apparatus of claim 11, wherein the processor is further configured to:
form a first time series of serial numbers 1 to n through the first MFCC, form a second time series of serial numbers 1 to m through the second MFCC, and form a two-dimensional coordinate system by taking (1, m) or (1, n) as an origin through the first time series and the second time series, m and n being natural numbers greater than 1;
for a minimum cumulative distance D(i, j) of a position (i, j) in the two-dimensional coordinate system, determine that D(i, j) of a position (i, j) in the two-dimensional coordinate system, determining that D(i, j)=$d_{ij}$+min[D(i−1, j), D(i, j−1), D(i−1, j−1)], where $d_{ij}$ is the cumulative distance from position (0,0) to position (i,j), D(i−1, j) represents a minimum cumulative distance of a position (i−1, j) in the two-dimensional coordinate system, D(i, j−1) represents a minimum cumulative distance of a position (i, j−1) in the two-dimensional coordinate system, and D(i−1, j−1) represents a minimum cumulative distance of a position (i−1, j−1) in the two-dimensional coordinate system; and determine a minimum cumulative distance D(m, n) of a position (m, n) in the two-dimensional coordinate system according to a presentation manner of the minimum cumulative distance D(i, j) and, in response to D(m, n) being less than or equal to a first set threshold value, determine that the difference between the first MFCC and the second MFCC is less than or equal to the set threshold value.

15. The apparatus of claim 11, wherein the processor is further configured to:
in response to receiving a message comprising a wakeup identifier from the second electronic device, determine that the message is the wakeup message, and
in response to determining that the present state is an awakened state, discard or shield the wakeup message.

16. The apparatus of claim 11, wherein the processor is further configured to:
determine whether a present wakeup mechanism based on the locally collected voice data is started, when YES, stop the present wakeup mechanism based on the locally collected voice data, and when NO, shield the present wakeup mechanism based on the locally collected voice data.

17. A device wakeup apparatus, arranged in a second electronic device, comprising:
a processor; and
a memory for storing instructions executable by the processor;
wherein the processor is configured to:
collect, by a microphone of the second electronic device, voice data;
recognize the voice data to generate recognized voice information;
match the recognized voice information in a voice instruction database and, in response to determining that the recognized voice information is matched with a wakeup instruction, call the wakeup instruction to wake up the second electronic device;
perform, by a filter of the second electronic device, Mel-frequency cepstral coefficient (MFCC) extraction on the voice data to acquire an MFCC of the voice data;
generate a wakeup message, the wakeup message comprising the MFCC of the voice data; and
broadcast the wakeup message through a communication interface of the second electronic device, wherein the wakeup message comprises a wakeup identification bit for indicating type of the wakeup message.

18. The apparatus of claim 17, wherein the processor is further configured to:
compensate a high-frequency part in the voice data to improve a resolution of the high-frequency part;
divide the compensated voice data into voice data segments according to a set time length;
multiply each of the voice data segments and a set Hamming window function to form a windowed voice data segment;
perform Fourier transform on the windowed voice data segment to obtain a spectrum of the windowed voice data segment;
filter the spectrum through a Mel-scale filter formed by T triangular bandpass filters and calculate a logarithm of the filtered spectrum to obtain logarithmic energy of each output, a value range of T being 20 to 30; and
perform discrete cosine transform (DCT) on the logarithm to obtain the MFCC of the voice data.

19. The apparatus of claim 18, wherein the processor is further configured to divide the compensated voice data into multiple voice data segments according to a first set time length, a first voice data segment and a second voice data segment that are adjacent in the multiple voice data segments having an overlapping voice segment of a second set time length and a value range of a ratio of the second set time length to the first set time length being ⅓ to ⅔.

20. The apparatus of claim 17, wherein the processor is further configured to, in response to determining that the recognized voice information is matched with the wakeup instruction and a present state is an awakened state, discard the recognized voice information and not call the wakeup instruction.

* * * * *